(12) United States Patent
Sato et al.

(10) Patent No.: US 9,092,840 B2
(45) Date of Patent: Jul. 28, 2015

(54) IMAGE PROCESSING APPARATUS, CONTROL METHOD OF THE SAME AND NON-TRANSITORY COMPUTER-READABLE STORAGE MEDIUM

(71) Applicant: CANON KABUSHIKI KAISHA, Tokyo (JP)

(72) Inventors: Yosuke Sato, Kawasaki (JP); Yasuhiro Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 13/901,834

(22) Filed: May 24, 2013

(65) Prior Publication Data

US 2013/0343636 A1    Dec. 26, 2013

(30) Foreign Application Priority Data

Jun. 20, 2012 (JP) .................. 2012-139158
Apr. 17, 2013 (JP) .................. 2013-086916

(51) Int. Cl.
*G06K 9/00* (2006.01)
*G06T 5/00* (2006.01)
*G06T 15/20* (2011.01)

(52) U.S. Cl.
CPC ............... *G06T 5/00* (2013.01); *G06T 15/205* (2013.01)

(58) Field of Classification Search
None
See application file for complete search history.

(56) References Cited

U.S. PATENT DOCUMENTS

| | | | |
|---|---|---|---|
| 2005/0105057 A1* | 5/2005 | Matsuda et al. | 353/70 |
| 2006/0082574 A1* | 4/2006 | Tsubaki | 345/419 |
| 2010/0290715 A1* | 11/2010 | Kimata et al. | 382/300 |

FOREIGN PATENT DOCUMENTS

JP    11-175762    *    7/1999    ............ G06T 17/00

* cited by examiner

*Primary Examiner* — Amara Abdi
(74) *Attorney, Agent, or Firm* — Fitzpatrick, Cella, Harper & Scinto

(57) ABSTRACT

An image processing apparatus for generating an image of an arbitrary viewpoint using a plurality of input images obtains image information of a projection position at which a point along a first straight line passing through the arbitrary viewpoint and a pixel position on the image of the arbitrary viewpoint is projected onto each of the plurality of input images, defines parallax information of the plurality of input images at the pixel position, using the image information obtained for the point along the first straight line, and generates the image of the arbitrary viewpoint, by defining the image information of the pixel position from the plurality of input images using the parallax information for the pixel position.

14 Claims, 12 Drawing Sheets

IMAGE PROCESSING APPARATUS, CONTROL METHOD OF THE SAME AND NON-TRANSITORY COMPUTER-READABLE STORAGE MEDIUM

BACKGROUND OF THE INVENTION

1. Field of the Invention

The present invention relates to an image processing apparatus, a control method of the same, and a non-transitory computer-readable storage medium.

2. Description of the Related Art

Technology (arbitrary viewpoint video generation technology) for using omni-directional images (images recording a full 360 degrees from a viewpoint) captured from a plurality of different viewpoints to generate an image that would be obtained if captured from an arbitrary viewpoint has been proposed. Generally, as such technology for performing arbitrary viewpoint image generation processing, Japanese Patent Laid-Open No. 11-175762 and Koshizawa Hiroyuki, et al. "Novel View Generation from Omni-Directional Videos Using Viewpoint-Dependent Deformable 3-D Mesh Model", Meeting on Image Recognition and Understanding (MIRU 2009), July, 2009 are known.

Japanese Patent Laid-Open No. 11-175762 describes a configuration using a plurality of omni-directional images obtained from a plurality of image capture apparatuses to generate an image from an arbitrary viewpoint. With the technology shown in Japanese Patent Laid-Open No. 11-175762, parallax information that is used when generating an arbitrary viewpoint image is calculated using a feature point extracted from an input image. More specifically, a feature point extracted from one input image is matched, using the line of sight connecting the viewpoint of another input image with a feature point on that input image as a basis for the matching. Here, information relating to the amount of position shift between the feature points obtained by the matching is detected as parallax information. Since the parallax information is thus detected on the basis of the line of sight connecting the viewpoint of one input image and a feature point on that input image, detecting parallax information in image areas other than the line of sight is problematic.

Koshizawa Hiroyuki et al. describes technology for compensating image information, using the parallax information of adjacent feature point positions in image areas where a parallax is not detected, when generating arbitrary viewpoint video using parallax information. Here, the parallax information used is not geometrically correct, and thus the image quality of the arbitrary viewpoint video is low.

SUMMARY OF THE INVENTION

The present invention has been made in view of the above problems, and technology for improving the image quality of an arbitrary viewpoint image generated from a plurality of input images is provided.

According to a first aspect of the present invention, an image processing apparatus is provided. The image processing apparatus comprises obtaining unit configured to obtain image information of a projection position at which a point along a first straight line passing through the arbitrary viewpoint and a pixel position on the image of the arbitrary viewpoint is projected onto each of the plurality of input images; first defining unit configured to define parallax information of the plurality of input images at the pixel position, using the image information obtained for the point along the first straight line by the obtaining unit; and generating unit configured to generate the image of the arbitrary viewpoint, by defining the image information of the pixel position from the plurality of input images using the parallax information for the pixel position.

According to a second aspect of the present invention, a control method is provided. The control method of an image processing apparatus for generating an image of an arbitrary viewpoint using a plurality of input images, comprising obtaining image information of a projection position at which a point along a first straight line passing through the arbitrary viewpoint and a pixel position on the image of the arbitrary viewpoint is projected onto each of the plurality of input images; defining parallax information of the plurality of input images at the pixel position, using the image information obtained for the point along the first straight line by the obtaining step; and generating the image of the arbitrary viewpoint, by defining the image information of the pixel position from the plurality of input images using the parallax information for the pixel position.

Further features of the present invention will become apparent from the following description of exemplary embodiments (with reference to the attached drawings).

DESCRIPTION OF THE EMBODIMENTS

Hereinafter, preferred embodiments of the present invention will be described with reference to the attached drawings.

Embodiment 1

Figure 1A:
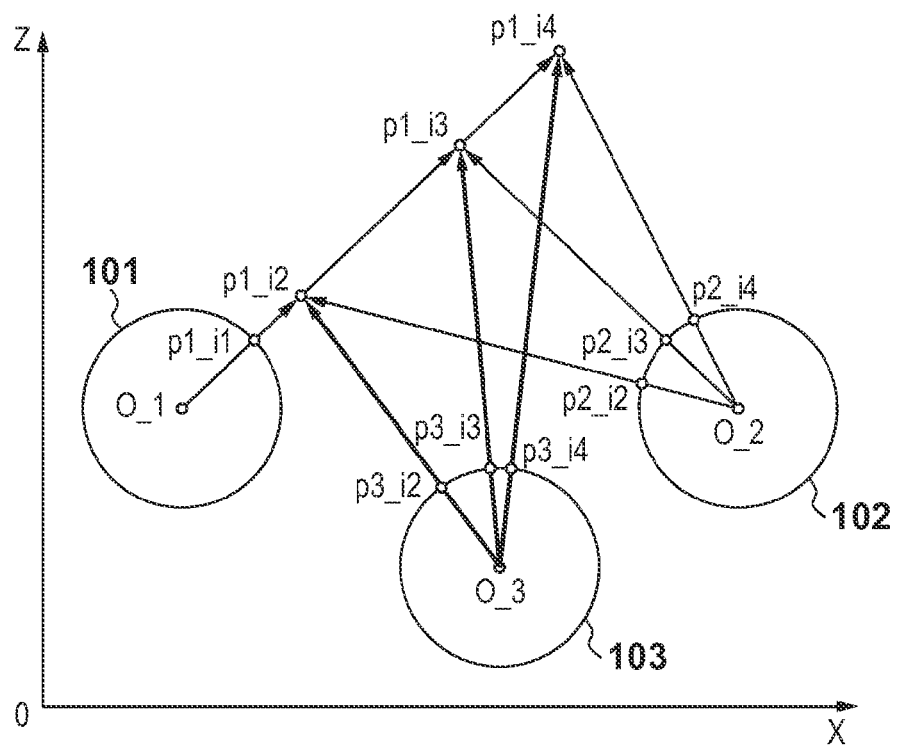
FIGS. 1A and 1B are schematic diagrams illustrating generation of an arbitrary viewpoint image according to an embodiment.
Figure 1B:
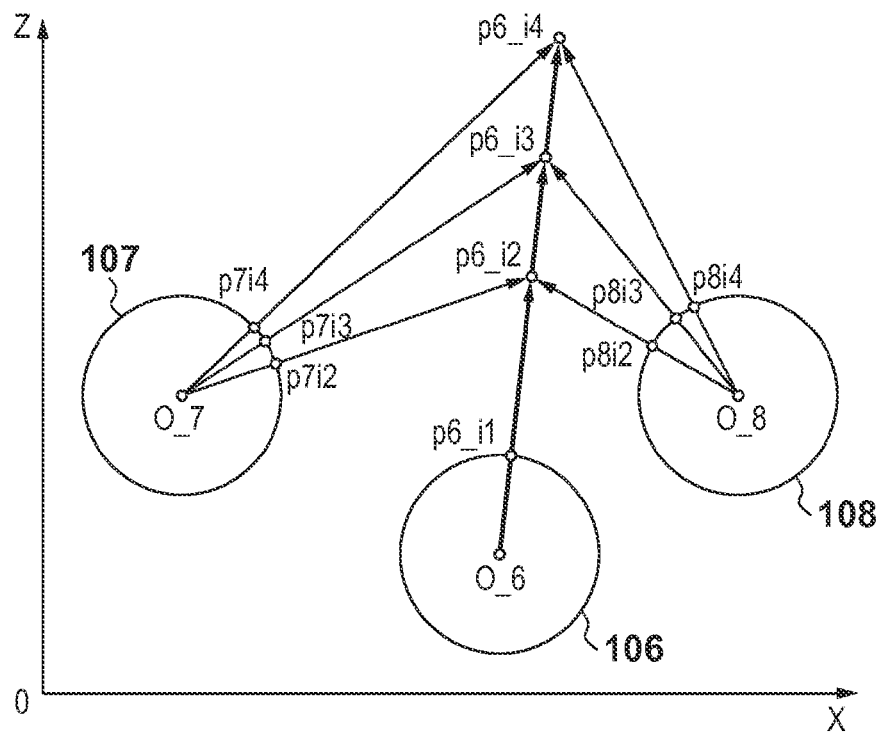

As an overview of the present embodiment, differences and features of the present invention relative to the conventional technology will be described using the drawings. FIGS. 1A and 1B are schematic diagrams for illustrating the differences between the technology described in Japanese Patent Laid-Open No. 11-175762 and the present embodiment. Generally, in order to calculate parallax information (parallax vector), corresponding positions of image data needs to be specified using a plurality of images. With the technology described in Japanese Patent Laid-Open No. 11-175762 and the present embodiment, parallax information is calculated based on a 3-D model in 3-D space.

Note that, in the present embodiment, description will be given in conjunction with a 2-D model in 2-D space. In the following description, omni-directional images captured from viewpoints that are placed in given positions in 3-D space are assumed to be placed on an XZ plane. Also, a light beam function that is used in the description is given as the following linear function.

$$R(t)=O+tD \quad (1)$$

In equation (1), t is a distance parameter represented by a scalar, and R(t), O and D are vectors. With the 3-D model in 3-D space, the vectors are 3-D vectors and they are used in order to show coordinate values and direction. With the 2-D model in 2-D space, the vectors are 2-D vectors and they are similarly used in order to show coordinate values and direction.

FIG. 1A is a schematic diagram, included in Japanese Patent Laid-Open No. 11-175762, showing a method of calculating parallax information. In FIG. 1A, reference numerals 101 and 102 represent input images. In Japanese Patent Laid-Open No. 11-175762, one of these input images is selected. Here, the input image 101 is selected, and a given point p1_i1 on the circumference corresponding to a projection plane of the input image 101 is further selected. Note that image information is recorded at points on the circumference. A circle center O_1 of the input image 101 is defined, and a straight line R1 represented by the following equation (2) can be drawn using coordinate values O1 of the circle O_1 and the given point p1_i1. In equation (2), D1 is a unit direction vector that is calculated from the circle center O_1 and the point p1_i1, and whose size is 1. t1 is a distance parameter.

$$R1(t1)=O1+t1 \times D1 \quad (2)$$

In equation (2), a point on the straight line represented by equation (1) can be specified by inputting a given value into t1. For example, when the point p1_i1 is specified as shown in FIG. 1A, t1=1. Also, when points p1_i2, p1_i3 and p1_i4 are specified as shown in FIG. 1A, t1=a, t1=b and t1=c (1<a<b<c), respectively.

Next, a projection position p2_i2, in the input image 102, of a feature point p1_i2 on the plane is calculated. First, a straight line R2 passing through the projection position p2_i2 and a circle center O_2 is represented as shown in equation (3). Here, O2 are the coordinate values of the circle center O_2, and D2 is a unit direction vector that is calculated from the circle center O_2 and the point p1_i2. t2 is a distance parameter.

$$R2(t2)=O2+t2 \times D2 \quad (3)$$

The projection position p2_i2 is obtained by modifying equation (3) as shown in equation (4). In equation (4), stand is a function (R'=stand(R)) that returns the unit vector of the input vector.

$$D2=\text{stand}(R2(t2)-O2) \quad (4)$$

Additional description of the unit vector and stand will be given here. The unit vector R' relative to the vector R is represented as R'=R/|R|=R/r. Here, r=|R| is the length of the vector R.

In the case of a 3-D space xyz, the vector R can be represented as R=xI+yJ+zK. I, J and K are the unit vectors of the axial directions x, y and z, respectively. The length of the vector is represented as $|R|=\text{sqrt}(x^2+y^2+z^2)$. sqrt is a function that returns the square root of input values. Accordingly, the unit vector R' is represented by the following equation (5).

$$R'=\text{stand}(R)=x/|R|I+y/|R|J+z/|R|K \quad (5)$$

In the case of a 2-D plane xz, the vector R can be represented as R=xI+zK. The length of the vector is represented as $|R|=\text{sqrt}(x^2+z^2)$. Accordingly, the unit vector R' is represented by the following equation (6).

$$R'=\text{stand}(R)=x/|R|I+z/|R|K \quad (6)$$

Next, a matching evaluation value between the image information recorded at the point p1_i1 and the image information recorded at the projection position p2_i2 is calculated. This matching evaluation value is given as i(1-2). Note that the matching evaluation value will be discussed in detail later. Similarly, a projection position p2_i3 in the input image 102 is also calculated for a feature point p1_i3. A matching evaluation value i(1-3) between the image information recorded at the point p1_i1 and the image information recorded at the projection position p2_i3 is then calculated. A matching evaluation value i(1-4) is similarly calculated for a feature point p1_i4.

A parallax is calculated by comparing the matching evaluation values i(1-2), i(1-3) and i(1-4) calculated as described above. A parallax as described in Japanese Patent Laid-Open No. 11-175762 is, specifically, the distance from the circle center O_1 to a feature point (one of p1_i2, p1_i3 and p1_i4) on the plane having the highest matching evaluation value.

If the parallax is calculated with i(1-2), it is geometrically valid, from an arbitrary viewpoint image 103, for image information to be recorded at a projection position p3_i2 on a straight line connecting a circle center O_3 of the arbitrary viewpoint image 103 and the feature point p1_i2. Here, the projection position p3_i2 is calculated as follows. First, a straight line R3 passing through the projection position p3_i2 and the circle center O_3 is represented as in equation (7). Here, O3 are coordinate values of the circle center O_3, and D3 is a unit direction vector that is calculated from the circle center O_3 and the feature point p1_i2. t3 is a distance parameter.

$$R3(t3)=O3+t3 \times D3 \quad (7)$$

The projection position p3_i2 is obtained by modifying equation (7) as in equation (8).

$$D3=\text{stand}(R3(t3)-O3) \quad (8)$$

A projection position p3_i3 and a projection position p3_i4 can be calculated in a similar manner.

In this way, with the technology described in Japanese Patent Laid-Open No. 11-175762, the parallax is calculated on the straight line R1 represented by equation (2) that passes through the circle center O_1 of the input image 101. The projection position in the arbitrary viewpoint image 103 thus depends on the parallax of the input image 101 and the input image 102, and cannot be uniquely specified.

On the other hand, FIG. 1B is a schematic diagram showing a method of calculating parallax information according to the present embodiment. In the present embodiment, first an arbitrary viewpoint image 106 is selected. In the selected arbitrary viewpoint image 106, a given point p6_i1 (pixel position) on the circumference corresponding to the projection plane is selected. A circle center O_6 (arbitrary viewpoint) of the arbitrary viewpoint image 106 is defined, and a straight line represented by the following equation (9) can be drawn, using coordinate values 06 of the circle center $O\_6$ and the given point p6_i1 on the circumference. In equation (9), D6 is a unit direction vector calculated from the circle center $O\_6$ and the point p6_i1. Also, t6 is a distance parameter, and a point on the straight line represented by equation (9) can be specified by inputting a given value into t6.

$$R6(t6)=O6+t6 \times D6 \quad (9)$$

For example, when the point p6_i1 is specified as in FIG. 1B, t6=1. Also, when the points p6_i2, p6_i3 and p6_i4 are specified as in FIG. 1B, t6=d, t6=e and t6=f (1<d<e<f), respectively.

Next, a projection position p7_i2 in an input image 107 is calculated for a point p6_i2 on the plane, using the following equations (10) and (11). Here, O7 are the coordinate values of a circle center $O\_7$ of a circle corresponding to the projection plane of the input image 107, and D7 is a unit direction vector that is calculated from the circle center $O\_7$ and the point p6_i2. D7 coincides with a projection position p7_i2 on the image plane that is formed at a position of distance 1 from the circle center $O\_7$ of the input image 107. t7 is a distance parameter.

$$R7(t7)=O7+t7 \times D7 \quad (10)$$

$$D7=\text{stand}(R7(t7)-O7) \quad (11)$$

Similarly, in an input image 108, a projection position p8_i2 relative to the point p6_i2 on the plane is calculated using the following equations (12) and (13). O8 are the coordinate values of a circle center $O\_8$ of a circle corresponding to the projection plane of the input image 108, and D8 is a unit direction vector that is calculated using the circle center $O\_8$ and the point p6_i2. D8 coincides with the projection position p8_i2 on the image plane that is formed at a position of distance 1 from the circle center $O\_8$ of the input image 108. t8 is a distance parameter.

$$R8(t8)=O8+t8 \times D8 \quad (12)$$

$$D8=\text{stand}(R8(t8)-O8) \quad (13)$$

Next, the matching evaluation value between the image information recorded at the projection position p7_i2 of the input image 107 and the image information recorded at the projection position p8_i2 of the input image 108 is calculated. This matching evaluation value is given as i(6-2). Similarly, a projection position p7_i3 in the input image 107 and a projection position p8_i3 in the input image 108 are calculated for a point p6_i3, and the matching evaluation value between the image information recorded at these two projection positions is calculated. This matching evaluation value is given as i(6-3). A matching evaluation value i(6-4) is similarly calculated for a point p6_i4.

The parallax of the point p6_i1 (pixel position) is calculated by comparing the evaluation values i(6-2), i(6-3) and i(6-4) calculated as described above. A parallax according to the present embodiment is, specifically, the distance from the circle center $O\_6$ to a point on the plane having the highest matching evaluation value. Whichever of the evaluation values i(6-2), i(6-3) and i(6-4) is the highest, it is geometrically valid for image information to be recorded at the position of the point p6_i1 on the straight line connecting the circle center $O\_6$ of the arbitrary viewpoint image 106 and the points p6_i2 to p6_i4. In the present embodiment, the parallax is thus calculated on a straight line R6 represented by equation (9) that passes through the circle center $O\_6$ of the arbitrary viewpoint image 106. The projection position in the arbitrary viewpoint image 106 can thus be specified uniquely, without being dependent on the parallax. Note that the input images 107 and 108 and the arbitrary viewpoint image 106 generated therefrom may be still images or moving images.

Image Processing Apparatus

Figure 2:
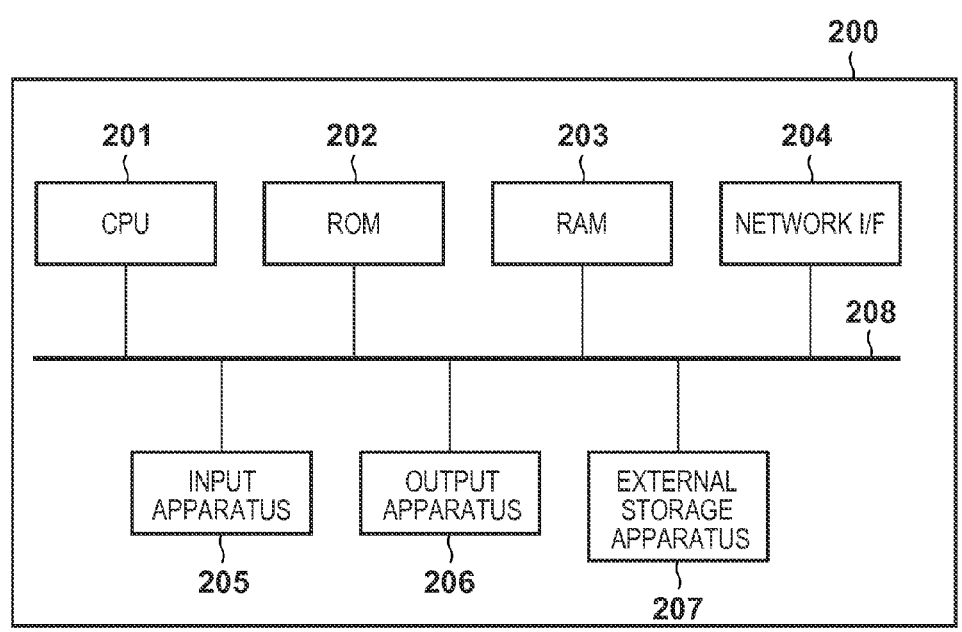
FIG. 2 is a diagram showing an exemplary hardware configuration of a computer of an embodiment.

FIG. 2 is a diagram showing an exemplary hardware configuration of a computer according to the present embodiment. A CPU (Central Processing Unit) 201 executes an OS (Operating System), application programs and the like that are stored in an external storage apparatus (hard disk) 207 to control operations of an image processing apparatus 200. Note that the CPU 201 executes a corresponding processing program. Also, the CPU 201 performs control for temporarily storing information, files and the like required for program execution in a RAM (Random Access Memory) 203. A ROM (Read Only Memory) 202 stores programs such as a basic I/O program. The RAM 203 functions as a main memory, a work area and the like of the CPU 201. A network I/F 204 is an interface for connecting to a PAN (Personal Area Network), a LAN (Local Area Network) and a WAN (Wide Area Network) and communicating with external apparatuses. Apart from a mouse, a keyboard and the like for receiving input from a user, the input apparatus 205 can include an image capture apparatus for capturing an image of a subject and performing image input. Having this image capture apparatus enables the image processing apparatus 200 to function as a digital camera or a digital camcorder.

Figure 3:
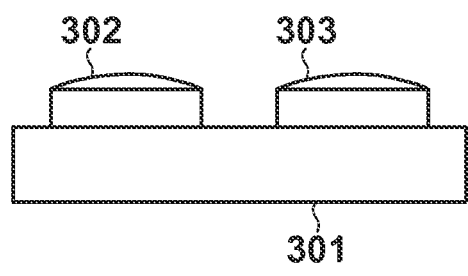
FIG. 3 is a schematic diagram showing an input apparatus of an embodiment.

The image capture apparatus in the input apparatus 205 is shown in the schematic diagram of FIG. 3. The image capture apparatus is constituted by a camera body 301, a first image capture lens unit 302, and a second image capture lens unit 303. The first image capture lens unit 302 and the second image capture lens unit 303 are provided with an optical system equivalent to a super wide-angle lens having an angle of view of at least 180 degrees. In the present invention, the number of viewpoints, rather than the number of lenses, is a constituent element. There are at least two viewpoints. In the present embodiment, the number of viewpoints is two. Also, the image capture apparatus of the input apparatus 205 is assumed to input a plurality of omni-directional images such as denoted by reference numeral 401 shown in FIG. 4. The omni-directional image 401 is an image projected onto a spherical plane, and the spherical plane is a plane of a sphere having a predetermined radius 403, centering on a viewpoint position 402.

Returning to FIG. 2, an output apparatus 206 is a display apparatus such as a liquid crystal display. The external storage apparatus 207 stores an application program, a driver program, an OS (Operating System), a control program, a processing program for executing processing corresponding to the present embodiment, and the like. A system bus 208 administers the data flow in the apparatus.

Image Processing Method

Figure 5:
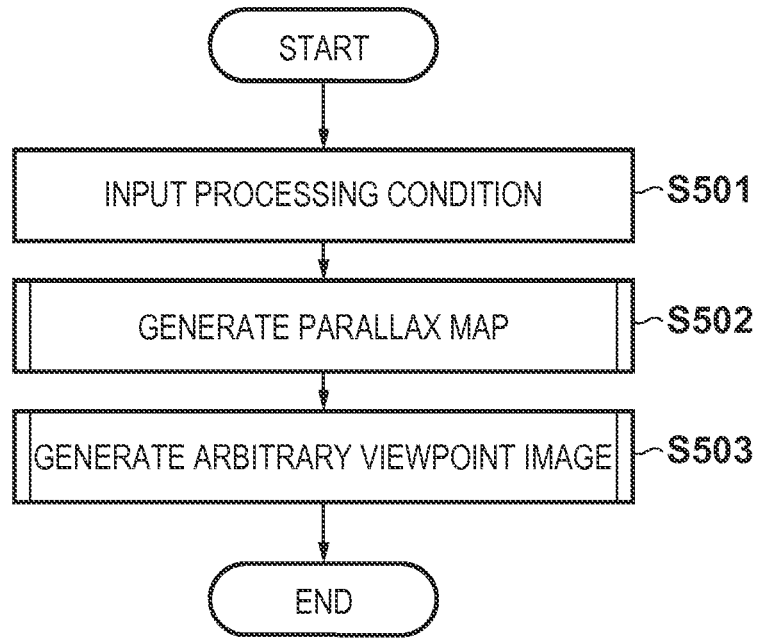
FIG. 5 is a flowchart showing overall processing according to an embodiment.

FIG. 5 is a flowchart illustrating an image processing program (hereinafter, the main processing program (main processing)) of the present embodiment that is executed by the CPU 201. The main processing program represented by this flowchart normally is recorded in the external storage apparatus 207, and read from the external storage apparatus 207, expanded in the RAM 203 and executed by the CPU 201 at the start of processing.

S501 is a step of inputting a processing condition. The CPU 201 inputs information required by the main processing program. Input information can be obtained by being read from the external storage apparatus 207 by the main processing program or can be obtained via the network I/F 204. Also, a configuration may be adopted in which a user input is read via the input apparatus 205.

Figure 4:
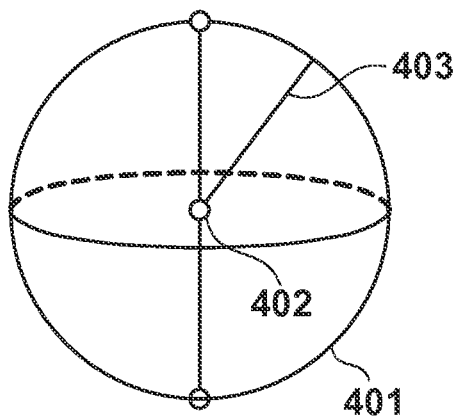
FIG. 4 is a schematic diagram showing a projected shape of an input image of an embodiment.

In the present embodiment, omni-directional images are used as input information with respect to the viewpoint 402, as shown in FIG. 4, and the omni-directional images of two or more different viewpoints are input. The viewpoint position of each viewpoint and the line of sight are also input. In the case where the viewpoint position and the line of sight are fixed, or where fluctuation in the viewpoint position and the line of sight can be obtained beforehand, a configuration is adopted in which this information is read from the external storage apparatus 207.

Here, the projection plane of an input image will be described. Generally, when capturing an image, a scene is often projected onto a flat plane and recorded as an image. In view of this, the image processing apparatus of the present embodiment is capable of inputting a flat projection plane. Also, the image processing apparatus is further capable of inputting an image that has a projection plane other than a flat plane but can be converted by projection into a flat projection plane. Examples of such a projection plane include a cylindrical plane, a spherical plane and a plurality of flat planes. In the present embodiment, an image having a cylindrical projection plane is input. By thus enabling the input of projection planes of many shapes, the image processing apparatus of the present embodiment can be provided with a general-purpose configuration that is capable of handling a wide range of images. Note that the image capture settings (ISO speed, exposure time, aperture value, focus) for when capturing the images of the respective viewpoints are assumed to be the same. The accuracy of processing for comparing images which will be discussed later can be increased by thus configuring the image capture settings to be the same. It is assumed, however, that in the present embodiment the image capture settings need not be the same between images.

Also, the value taken by the distance parameter t1 in equation (1), as described in the overview of the present embodiment, is set as input information. That is, a step is of the distance parameter, an upper limit t_end of the distance parameter, and a lower limit t_start of the distance parameter are input. Processing using these values will be discussed later.

In S501, the viewpoint position of an arbitrary viewpoint image is further input and the projection plane of the arbitrary viewpoint image is set. Here, the projection plane of an arbitrary viewpoint image will be described. The image processing apparatus of the present embodiment is capable of outputting an image having a flat projection plane, as an arbitrary viewpoint image serving as the final output. The image processing apparatus is further capable of outputting an image having a projection plane other than flat plane but can be converted by projection into a flat projection plane. Examples of such a projection plane include a cylindrical plane, spherical plane and a plurality of flat planes. Hereinafter, the case where an image having a cylindrical projection plane is output will be described.

S502 is a step of generating a parallax map. The CPU 201 divides the arbitrary viewpoint image set at S501 into predetermined blocks, and calculates parallax information (depth information) in block units, using input omni-directional images. A parallax map is then generated by mapping the calculated parallax information to the divided blocks on the arbitrary viewpoint image.

The parallax map generation step S502 will be described using FIG. 6. Note that, in the following description, the flowchart shown in FIG. 6 will be called "sub-flowchart 1".

S601 is a block generation step in which the CPU 201 designates a given image area in the arbitrary viewpoint image. In the present embodiment, an arbitrary viewpoint image projected onto a cylindrical coordinate system is generated. The cylindrical coordinate system can be converted by projection into a spherical coordinate system. Also, the spherical coordinate system can be converted by projection into a cylindrical coordinate system. A parallax map of the arbitrary viewpoint image in the cylindrical coordinate system is generated utilizing this fact.

Figure 7A:
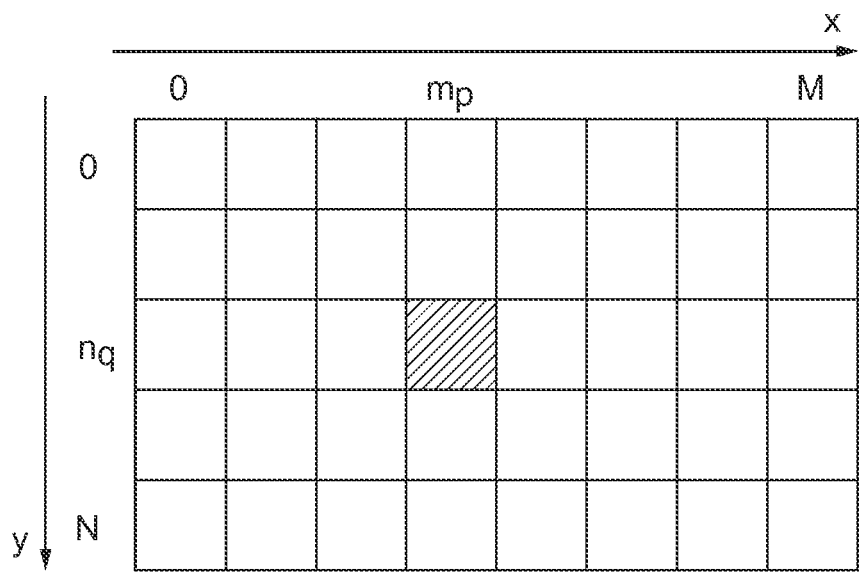
FIGS. 7A and 7B are diagrams illustrating block division processing using an input image according to an embodiment.
Figure 7B:
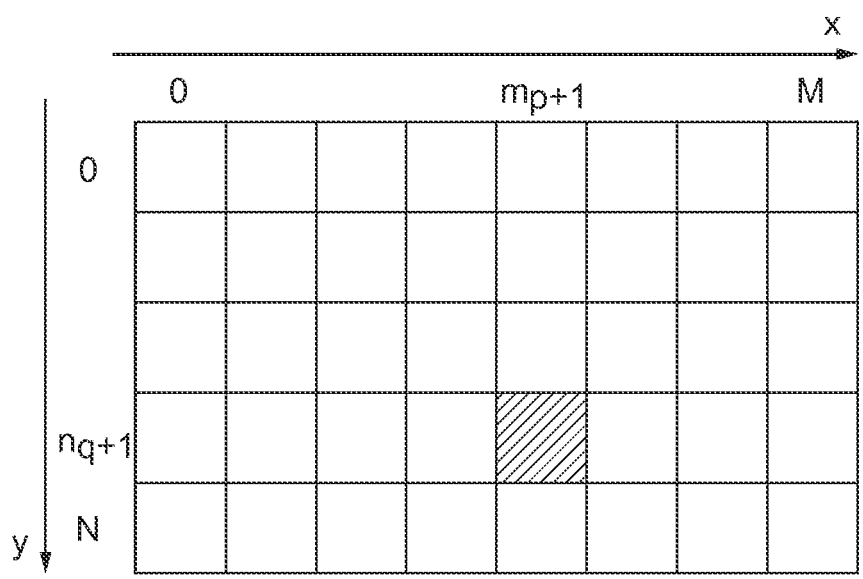

S602 is a step of updating the reference block for searching. The processing of S602 will be described using FIG. 7. The schematic diagram shown in FIG. 7 is a flat development view of a cylindrical coordinate system. A projection plane of the cylindrical coordinate system can be developed into a flat plane, and blocks are generated by dividing the image area. In the present embodiment, the image area is divided into equally-spaced square blocks. By dividing the image area into M+1 blocks in the x direction and N+1 blocks in the y direction, the flat development view of the cylindrical coordinate system is divided into blocks such that the total number of blocks is (M+1)×(N+1). A pointer for instructing a block to be processed is updated in the generated group of blocks. In FIG. 7A, the block of row $m_p$ and column $n_q$ is selected. After the block has been selected as shown in FIG. 7A, a different block from the block of row $m_p$ and column $n_q$ selected in FIG. 7A is selected, such as selecting the block of row $m_{p+1}$ and column $n_{q+1}$, as shown in FIG. 7B. Note that although the selection order of blocks is not particularly defined, a block that has been selected before cannot be selected again.

S603 is a step of updating a light source estimated distance parameter. The distance parameter t of a first light beam function (first straight line) is updated by the step ts of the distance parameter, as represented by equation (14). The range of values that the distance parameter t can take is defined by the upper limit t_end of the distance parameter and the lower limit t_start of the distance parameter. That is, the distance parameter t is in the relation t_start≤t≤t_end. Here, t_start is greater than or equal to 0, and t_end is less than infinity.

$$t = t + ts \tag{14}$$

The initial value of the distance parameter t is able to take a desired value within the range of values that can be taken by the distance parameter t. Also, ts is able to take either a constant or a variable. In the case where ts takes a variable, ts may take the form of a function such as ts=f(x)=ax+b, or a configuration may be adopted in which values stored in an array such as ts0=0, ts1=1, ts2=2, ts3=3, ts4=5, and ts5=7 and so on are referred to sequentially.

S604 is a step of generating a block image. The following three processes are performed in this step:
(1) Calculation of a given point p on the plane using the first light beam function (first straight line);
(2) Calculation of a second light beam function (second straight line) using the given point p on the plane and the viewpoint of the input image; and
(3) Generation by interpolation of a pixel at the point of intersection between the second light beam function and the projection plane of the input image.

The above processes (1) to (3) in S604 will be described using FIG. 8.

Figure 6:
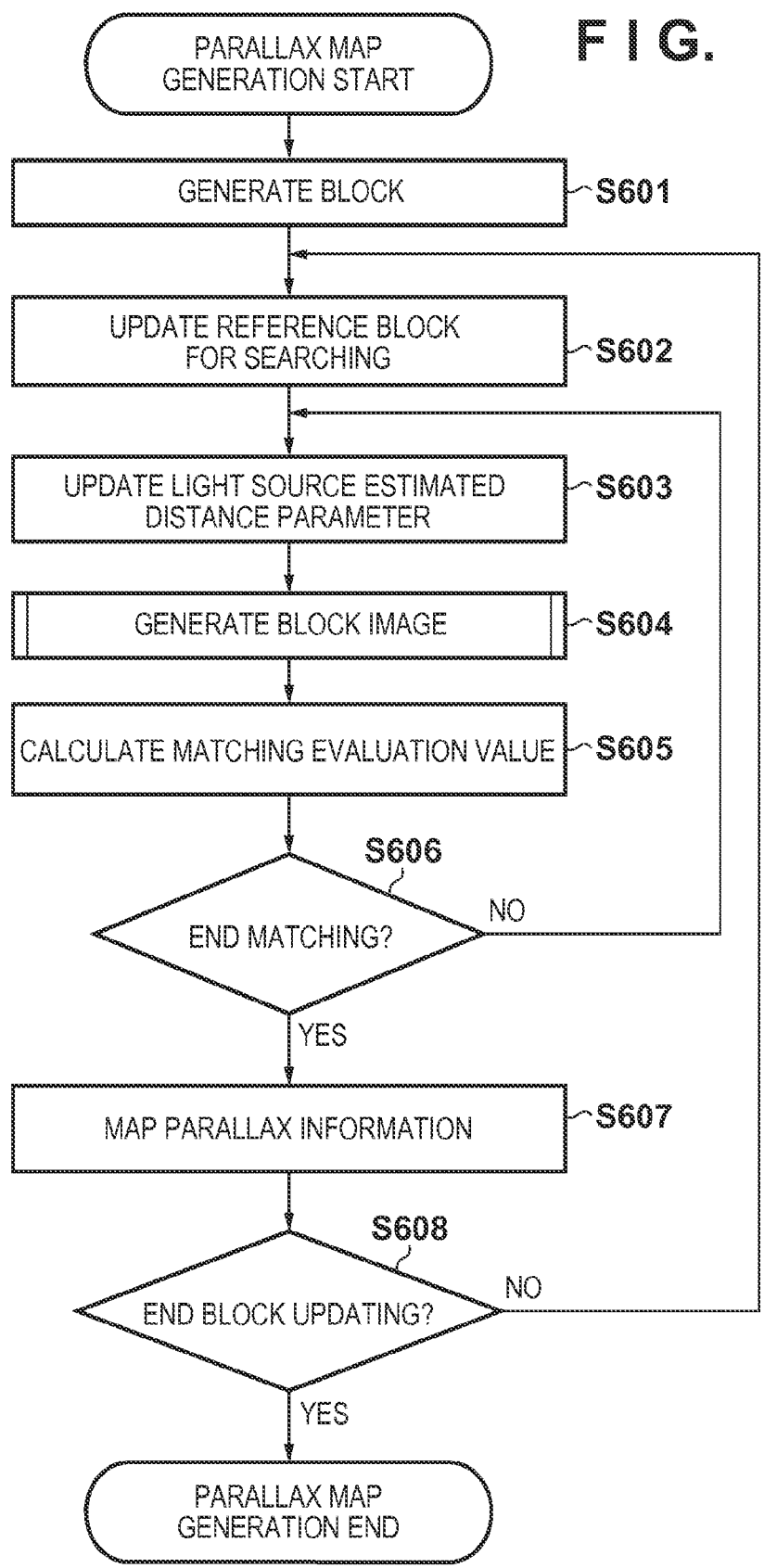
FIG. 6 is a flowchart showing processing for generating a parallax map according to an embodiment.
Figure 8:
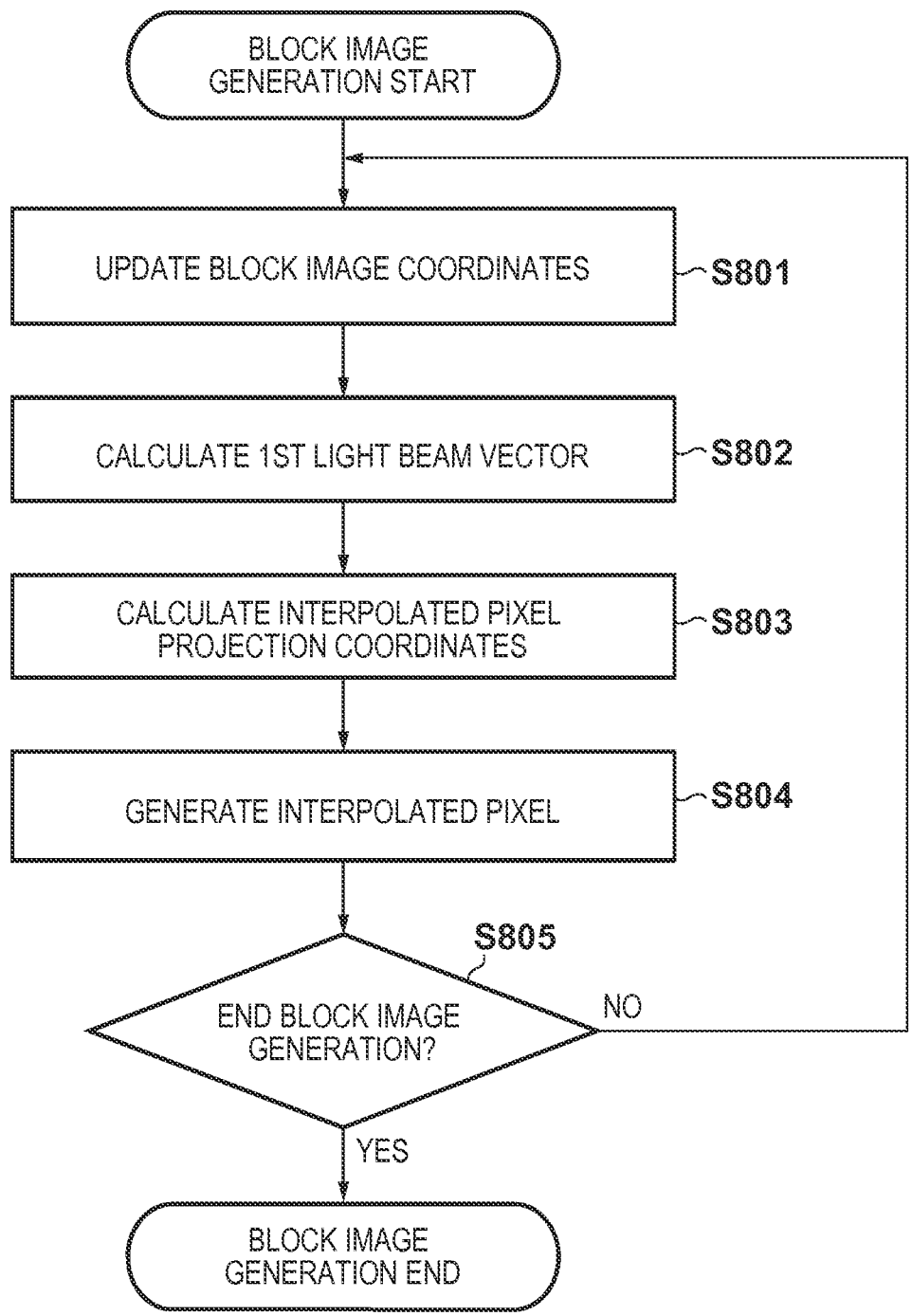
FIG. 8 is a flowchart showing processing according to an embodiment.

FIG. 8 is a processing flowchart that details the processing of S604 in FIG. 6. Note that, in the following description, the processing flowchart shown in FIG. 8 is called "sub-flowchart 2". Also, the schematic diagram of FIG. 9 is used to supplement the description of the processing of the sub-flowchart 2. Note that, hereinafter, a method of generating a block image BK1 that is obtained from the input image 107 will be discussed. Description regarding a block image BK2 that is obtained from the input image 108 with a similar method will be omitted.

Figure 9A:
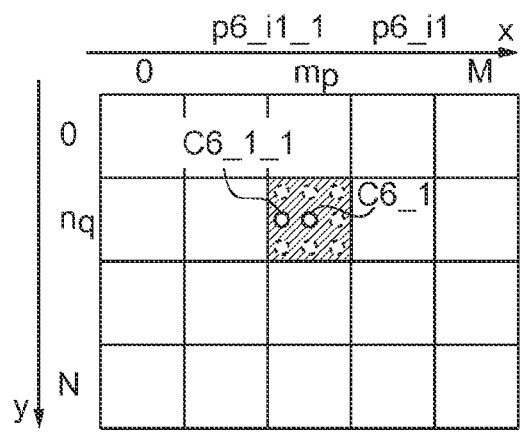
FIGS. 9A to 9C are schematic diagrams showing processing according to an embodiment.

FIG. 9A is a flat development view (arbitrary viewpoint block image) of the cylindrical coordinate system of the arbitrary viewpoint image 106, in which the block of row $m_p$ and column $n_g$ is selected from a total number of (M+1)×(N+1) blocks, with this being illustrated by the shaded portion. Each block is constituted by a plurality of pixels. For example, in the present embodiment, 1 block is constituted by 9 pixels consisting of 3×3 pixels.

Figure 9B:
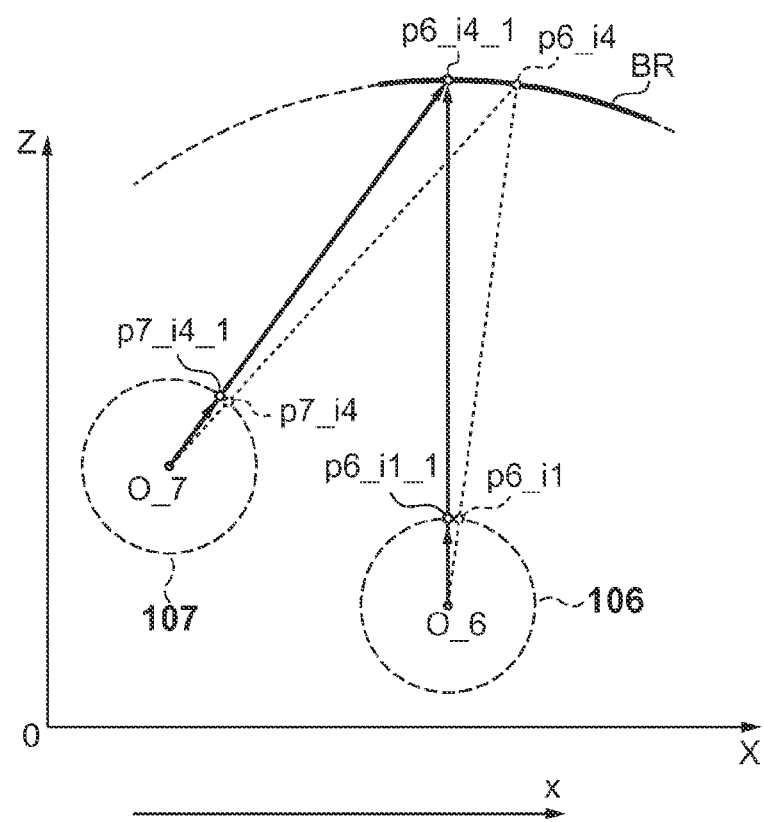
Figure 9C:
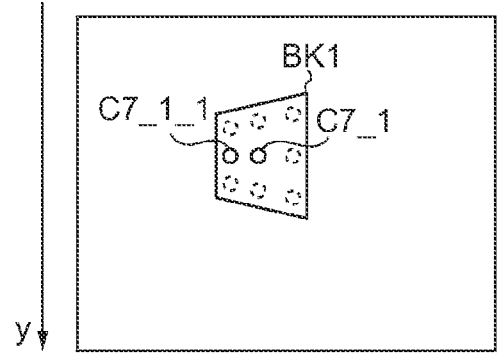

FIG. 9B is a diagram schematically showing a vector of a light beam at the time that light emitted from a light source placed virtually in 3-D space reaches two different viewpoints. Note that in FIG. 9B the same reference numerals as FIG. 1B are given to contents that are the same as FIG. 1B. Also, FIG. 9C is a flat development view of the cylindrical coordinate system of the input image 107. In FIG. 9C, the block image BK1 constituted by a set of points at which the second light beam function and the projection plane of the input image intersect is shown.

S801 is a step of updating the coordinate values of pixels in a block. The blocks in FIG. 9A are each constituted by 9 pixels consisting of 3×3 pixels, and the CPU 201 selects one of 9 pixels of 3×3 in order to perform processing on these pixels one at a time.

S802 is a step of calculating the first light beam vector. In the block of row $m_p$ and column $n_q$ shown in FIG. 9A, the coordinate values (pixel position) of adjacent pixels C6_1 and C6_1_1 will be represented by respectively different unit direction vectors p6_i1 and p6_i1_1 in the 3-D space shown in FIG. 9B. The unit direction vectors are uniquely defined by the circle center O_6 and the coordinate values of the pixels. The first light beam function is respectively calculated for each pixel in the block using these unit direction vectors. Thus, a feature of the main processing is mutually converting unit direction vectors used in a light beam function and the coordinate values of pixels in an image, using the center position of the image.

Calculation of the first light beam function when the unit direction vector p6_i1_1 has been selected will be described using FIG. 9B. In equation (9), when the distance parameter is given as t6=f, a position in 3-D space shown by the following equation (15) is calculated using the circle center O_6 and the unit direction vector p6_i1_1.

$$p6\_i4\_1 = O6 + t6 \times p6\_i1\_1. \quad (15)$$

As a result of S801 and S802 being repeated by S805 which is discussed below, the first light beam function is respectively calculated for all 9 pixels in the block of row $m_p$ and column $n_g$, using the unit direction vector and the circle center O_6.

As shown in FIG. 9B, it is clear that a circular arc of distance f centered on the circle center O_6 is formed by positions p6_i4 and p6_i4_1. Note that because processing is performed in 3-D space, it is in fact part of spherical plane that is formed.

S803 is a step of calculating projection coordinate values of interpolated pixels. A unit direction vector p7_i4_1 is derived as follows using the second light beam function calculated from the position p6_i4_1 and the circle center O_7 of the input image 107.

$$p7\_i4\_1 = stand(p6\_i4\_1 - O7) \quad (16)$$

The CPU 201 specifies a pixel coordinate values C7_1_1, as shown in FIG. 9C, from the obtained unit direction vector p7_i4_1 and the circle center O_7. FIG. 9C is a schematic diagram in which the input image 107 has been developed into a flat plane. The block image BK1 is constituted by the pixel coordinate values thus specified.

S804 is a step of generating interpolated pixels. Since the pixel coordinate values C7_1_1 are coordinate values of decimal accuracy, the CPU 201 generates pixel values by interpolation, using pixels having coordinate values of the integer accuracy that constitute the input image 107. As a method of generating pixels by interpolation, well-known interpolation technology can be applied, such as nearest neighbor interpolation, bilinear interpolation and bicubic interpolation. In the case of generating a pixel value at the pixel coordinate values C7_1_1 by interpolation using nearest neighbor interpolation, the pixel whose placement coordinates are nearest to the pixel coordinate values C7_1_1 among the pixels in the input image 107 is output as the pixel value at the pixel coordinate values C7_1_1.

Figure 10:
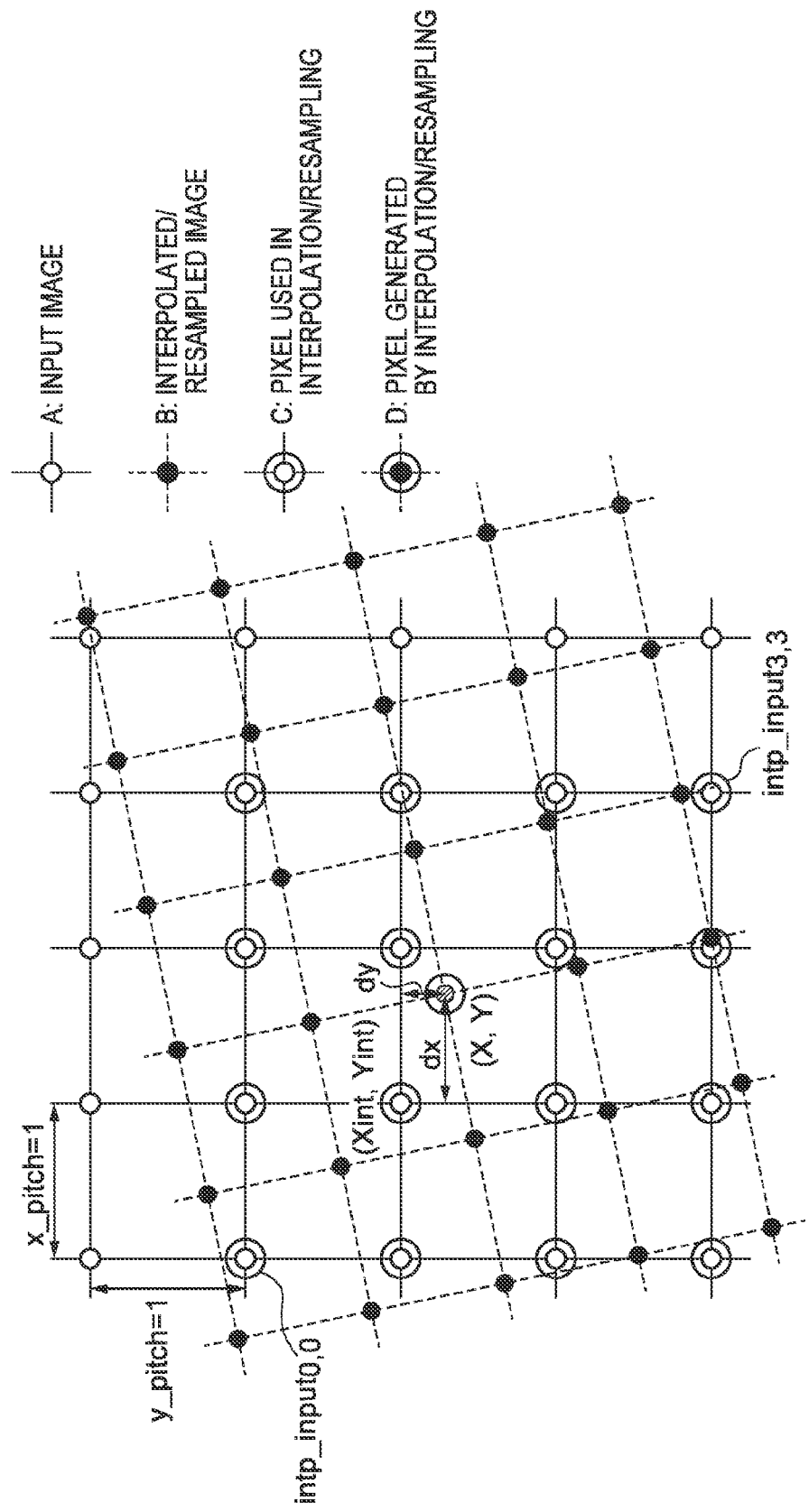
FIG. 10 is a schematic diagram showing processing for generating pixels by interpolation according to an embodiment.

In FIG. 10, a method of selecting an input pixel by bicubic interpolation is illustrated. In FIG. 10, an input pixel shown by (xint, yint) is specified by truncating the decimal, such that the pixel coordinate values C7_1_1 represented by D take integer values. An input pixel for performing bicubic interpolation on D is obtained by selecting 16 neighboring points around the pixel coordinate values C7_1_1 that are shown by C, on the basis of the specified input pixel. After obtaining a plurality of input pixels, interpolated pixel values are calculated by applying a bicubic interpolation function. Interpolated pixel values are similarly calculated in bilinear interpolation though applying a bilinear interpolation function, by obtaining a plurality of pixel values from the coordinate values of the nearest adjacent input pixel to the pixel coordinate values C7_1_1.

S805 is a step of determining whether to end block image generation. If all the pixels in the block have been selected at S801, the processing advance to S605, and if all of the pixels have not been selected, the processing advances to S801.

This completes the processing of the sub-flowchart 2 (S604 in FIG. 6) shown in FIG. 8. The block image BK1 is generated by the sub-flowchart 2 being completed. Also, the block image BK2 is similarly generated using the input image 108.

Returning to FIG. 6, S605 is a step of calculating a matching evaluation value. The CPU 201 matches the block image BK1 of the input image 107 and the block image BK2 of the input image 108. In the present embodiment, a SAD value (sum of absolute difference value) shown by equation (17) is calculated as the matching evaluation value. Note that in equation (17), M=N=3 in the present embodiment (coincides with block size). g(x) represents the image plane of the block image BK1, and h(x) represents the image plane of the block image BK2.

$$SAD = \sum_{m=0}^{M} \sum_{n=0}^{N} |g(x_0 + m, y_0 + n) - h(x_1 + m, y_1 + n)| \quad (17)$$

Alternatively, a correlation coefficient or least squares matching may be applied.

The CPU 201 outputs the matching evaluation value (SAD value) calculated by the matching operation. The distance parameter t6 is then updated at S603 and the calculation and comparison of new matching evaluation values are performed at S605 until it is determined to end the matching at S606 which will be discussed later.

When SAD values are used in the matching operation, the CPU 201 calculates the following comparison result Result, using a matching evaluation value $\text{SAD}_{pre}$ most highly matched among previous matching operation results (i.e., lowest value) and a current matching evaluation value $\text{SAD}_{cur}$.

$$\text{Result} = \begin{cases} 1 & (\text{SAD}_{cur} \leq \text{SAD}_{pre}) \\ 0 & (\text{SAD}_{cur} > \text{SAD}_{pre}) \end{cases} \quad (18)$$

If Result=0, the CPU 201 determines that the evaluation value that was best matched among the previously calculated matching evaluation values is more reliable, and discards the current matching evaluation value. If Result=1, the current matching evaluation value is a better match than all of the previously calculated matching evaluation values. That is, the CPU 201 determines that the parallax information used in order to calculate the block image used in the current matching operation is more correct parallax information. Parallax information will be discussed later. The CPU 201 sets the current matching operation result, that is, the best matched matching evaluation value, as $\text{SAD}_{pre}$, as shown in equation (19), in order to be used in the comparison with the new matching evaluation value calculated after the distance parameter t6 has been updated.

$$\text{SAD}_{pre} = \text{SAD}_{cur} \quad (19)$$

Also, the case where Result=1 also includes the case where the evaluation value that is best matched among the previously calculated matching evaluation value and the current matching evaluation value are the same. In this case, the matching evaluation value for the nearest point to the arbitrary viewpoint is set as $\text{SAD}_{pre}$.

The parallax information used in order to calculate the block images (BK1 and BK2) that are used in the current matching operation is held at the same time that the comparison result is obtained. The distance parameter t6 (t6=f in the present embodiment) is included in the held parallax information. Also included are the unit direction vectors p6_i1 and p6_i1_1 that are used in calculating the block image BK1 and the block image BK2. A configuration may also be adopted in which the difference between the unit direction vector p6_i1 and a unit direction vector obtained by conversion from the coordinate values of an adjacent pixel are included. The difference between two unit direction vectors obtained by conversion from adjacent pixels is obtained by calculating the difference between the unit direction vectors p6_i1 and p6_i1_1. Alternatively, a configuration may be adopted in which the block image BK1 and the block image BK2 are directly held.

S606 is a step of determining whether to end matching. The value that can be taken by the distance parameter t6 is determined by the step ts, the lower limit t_start, and the upper limit t_end. If the distance parameter t6 is set to a value exceeding the upper limit or the lower limit, matching is ended and the processing advances to S607. On the other hand, if the value to which the distance parameter t6 is set is within the range of values that can be taken, the processing advances to S603. The parallax information held when it is determined to end matching is thus parallax information having the highest matching evaluation calculated at S605, and this parallax information is defined as parallax information corresponding to the reference block for searching selected at S602.

S607 is a step of mapping parallax information. The CPU 201 holds the parallax information held at S605 in memory. In the present embodiment, the total number of blocks is (M+1)×(N+1), as shown in FIG. 9A, and the block of row $m_p$ and column $n_q$ is mapped to the memory position of row $m_p$ and column $n_q$. The parallax information is thus associated with the reference block for searching selected at S602.

S608 is a step of determining whether to end parallax map generation. When all of the total number of (M+1)×(N+1) blocks have been selected at S602, the processing of the sub-flowchart 1 ends, and if all of the blocks have not been selected, the processing advances to S602. This completes the processing of the sub-flowchart 1 (S502 in FIG. 5) shown in FIG. 6.

Figure 11:
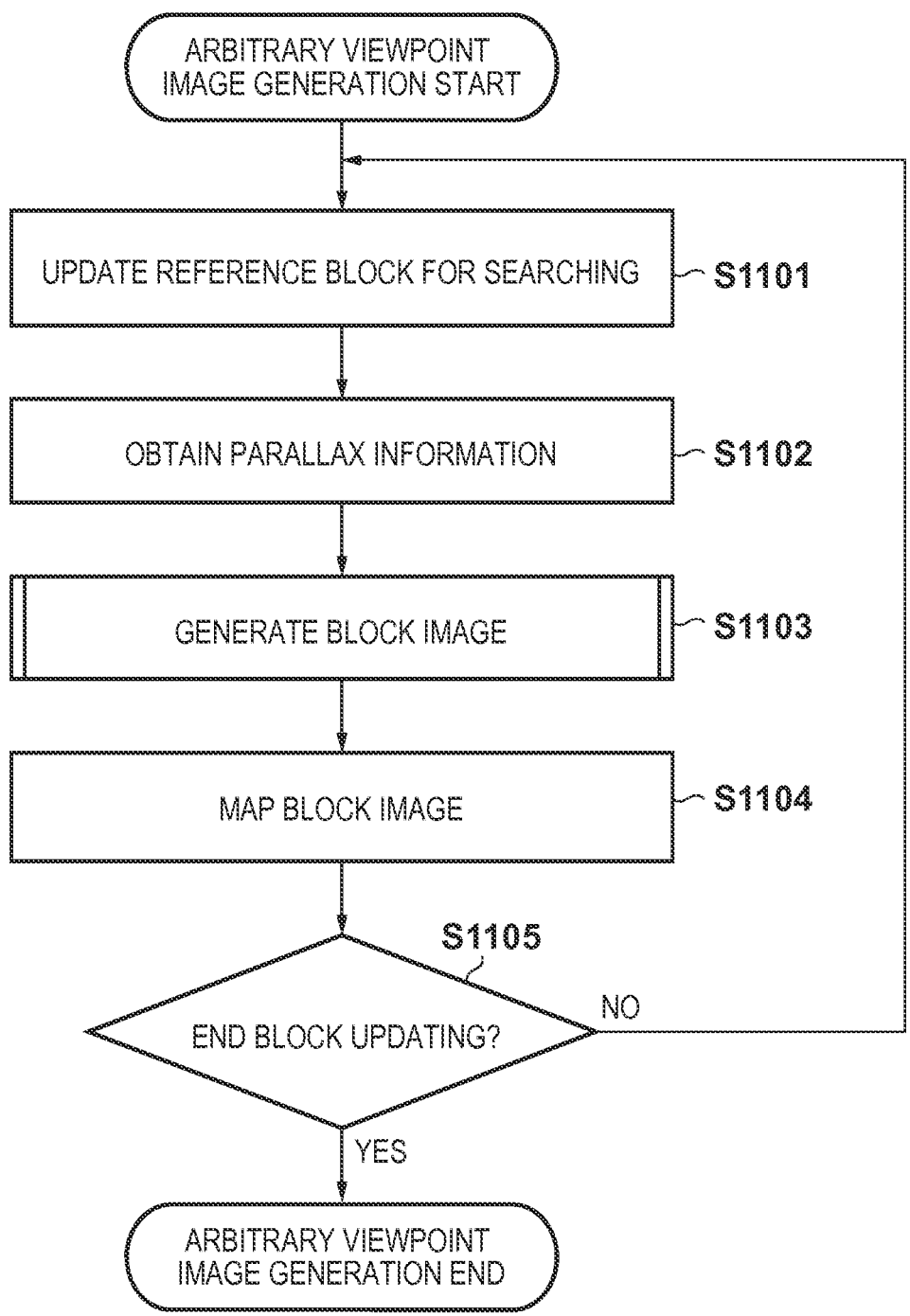
FIG. 11 is a flowchart showing processing according to an embodiment.

Returning to FIG. 5, S503 is a step of generating an arbitrary viewpoint image. The arbitrary viewpoint image 106 is generated by interpolation using the parallax map calculated at S502. A method of generating an arbitrary viewpoint image in the present embodiment will be described using FIG. 11. FIG. 11 is a processing flowchart that details the processing of S503 in FIG. 5. Note that, in the following description, the flowchart shown in FIG. 11 is called "sub-flowchart 3".

S1101 is a step of updating the reference block for searching. The processing content is the same as S602 in FIG. 6. S1102 is a step of obtaining parallax information. Parallax information corresponding to the block is obtained from the parallax map calculated at S502. In the present embodiment, the total number of blocks is (M+1)×(N+1). Hereinafter, the case where the block of row $m_p$ and column $n_g$ is mapped to the memory position of row $m_p$ and column $n_g$ will be described as an example of the processing for generating a block by interpolation.

S1103 is a step of generating a block image. The CPU 201 generates block images (block image BK1, block image BK2) of row $m_p$ and column $n_g$ from the obtained parallax information (distance parameter t6, unit direction vector p6_i1, unit direction vector p6_i1_1). The detailed processing content is the same as the processing content of S604 in FIG. 6 already described. Note that, as aforementioned, the block images BK1 and BK2 may be held as the parallax information most highly evaluated in S605.

S1104 is a step of mapping a block image. The CPU 201 copies the block image to the coordinate position of the block of row $m_p$ and column $n_g$. Because there are the two block images BK1 and BK2 for the input images 107 and 108, respectively, the copying of a block image involves generating a block image of an arbitrary viewpoint by averaging these block images (BK1, BK2).

Here, weighted averaging of BK1 and BK2 will be described. BK1 is 2-D pixel array represented by BK1(x, y). Similarly, BK2 is a 2-D pixel array represented by BK2(x, y). A 2-D pixel array BK3(x, y) of a newly generated block image BK3 is generated so as to be represented by the following equation (20). A and B may be set to values in the range of real numbers such that A+B=1. For example, it is conceivable to perform weighting in inverse proportional to distance, such as A=L/(K+L) and B=K/(K+L), where K is the distance between the viewpoint positions of the input image 107 and the arbitrary viewpoint image 106, and L is the distance between the viewpoint positions of the input image 108 and the arbitrary viewpoint image 106. Note that BK1(x, y) is the point at which the second light beam function obtained using the viewpoint of the input image 107 and the point defined using the parallax information on the first light beam function that passes through BK3(x, y) intersects the input image projection plane. Similarly, BK2(x, y) is the point at which the second light beam function obtained using the viewpoint of the input image 108 and the point defined using the parallax information on the first light beam function that passes through BK3(x, y) intersects the input image projection plane.

$$BK3(x,y)=A \times BK1(x,y)+B \times BK2(x,y) \qquad (20)$$

S1105 is a step of determining whether to end block updating. The CPU 201 ends the processing of the sub-flowchart 3 when all of the total number of (M+1)×(N+1) blocks have been selected at S1102, and advances the processing to S1101 if this is not the case.

This completes the processing of the main processing program shown in FIG. 5. As is clear from the above description, in the present embodiment, the feature points of an input image are not required in calculating parallax information. Also, because the parallax is calculated using a light beam function that is based on arbitrary viewpoint video, rather than being calculated using a light beam function that is based on an input image, it is possible to calculate parallax information in which the placement coordinate values of pixels in an arbitrary viewpoint image are geometrically correct.

As described above, according to the above embodiment, geometrically correct parallax information can be calculated even in an image area in which an input image does not have a feature point, enabling the image quality of an arbitrary viewpoint image to be improved.

Note that although an example was described in the abovementioned embodiment in which an image of an arbitrary viewpoint is generated from two input images, it is obvious that a configuration may be adopted in which an image of an arbitrary viewpoint can be generated using three or more input images.

Also, in the abovementioned embodiment, parallax information mapping for defining parallax information (parallax vector) for all of the blocks is performed (FIG. 6), and thereafter an arbitrary viewpoint image is generated while reading out parallax information (FIG. 11), but the abovementioned embodiment is not limited thereto. For example, in the case of processing a still image, because the parallax information (distance from an arbitrary viewpoint) is reliable in relation to one block in step S607 of FIG. 6, a configuration may be adopted in which steps S1103 and S1104 are executed for that one block at that time. It is thereby not necessary to hold parallax maps corresponding to all the blocks. On the other hand, generating and holding parallax maps enables an image from the arbitrary viewpoint to be generated utilizing the generated parallax maps, as long as the three-way positional relationship between the viewpoints of the input images and the arbitrary viewpoint does not change. Also, in the case of processing a moving image, the frames of the arbitrary viewpoint image can be generated from the frames of the input images using the held parallax maps.

Embodiment 2

In Embodiment 1 of the present invention, parallax information is generated and an arbitrary viewpoint is generated from the parallax information. In the present embodiment, an example is shown in which a surrounding environment light image that is used for rendering computer graphics (CG) is generated at an arbitrary position based on a plurality of viewpoint images.

Generally, in the case of rendering CG, the object data of an object or the like and light source data are required. In particular, with regard to light source data, a given object may serves as a light source, or the brightness of the surrounding environment may be rendered may be held as an image and rendering may be performed using this image as light source data. Here, a viewpoint image that is taken as a brightness image of the surroundings will be called a surrounding environment light image. The surrounding environment light image needs to be obtained according to the position of the subject to be rendered.

Figure 13A:
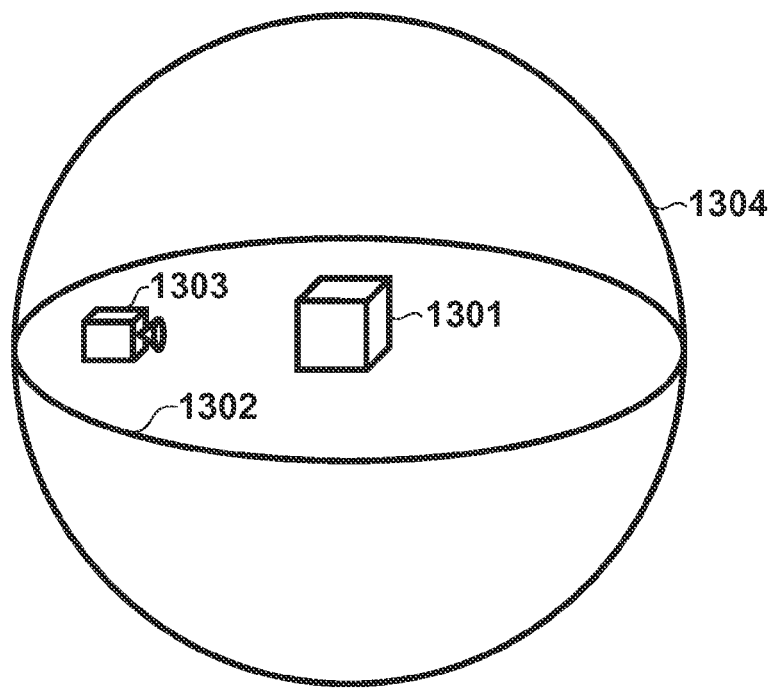
FIGS. 13A and 13B are diagrams showing the projected shapes of input images of the second embodiment.
Figure 13B:
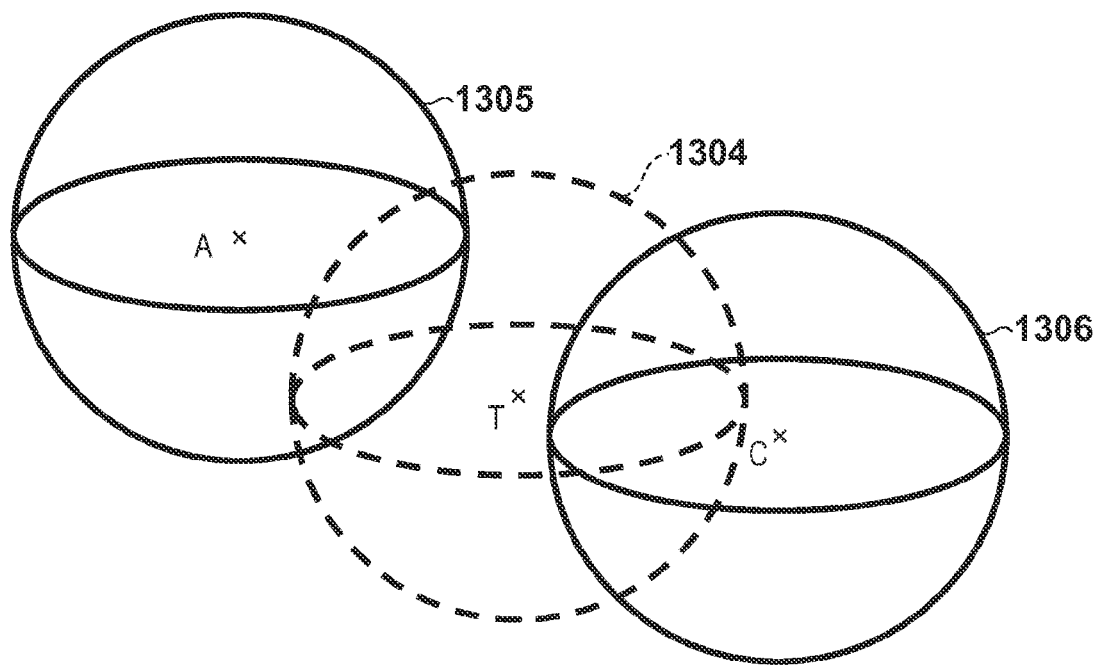

For example, as shown in FIG. 13A, in the case of rendering a scene consisting of a given object (a subject) 1301 and a surrounding 1302 from a viewpoint 1303 with a surrounding environment light image as the light source, the surrounding environment light image needs to be an omni-directional image with a center position T as denoted by reference numeral 1304. Also, the surrounding environment light image is the surrounding environment light image 1304 when the subject is in the position T, as shown in FIG. 13B. On the other hand, the surrounding environment light image will be a surrounding environment light image 1305 when the subject is in a position A, and a surrounding environment light image 1306 when the subject is in a position B. That is, a surrounding environment light image that depends on the position of the subject is required. Thus, in order to perform CG rendering that uses surrounding light environment images in arbitrary positions, innumerable surrounding environment light images are required. Here, according to the present embodiment, the surrounding environment light image 1304 of the position T can be generated from the surrounding environment light image 1305 of the position A and the surrounding environment light image 1306 of the position C. In other words, an arbitrary surrounding environment light image can be generated from the images of two or more viewpoints. Thus, CG rendering is possible using the surrounding environment light images at arbitrary positions, without needing to provide innumerable surrounding environment light images.

Also, in generating a surrounding environment light image, it is the bright portions of the image that contribute greatly as a light source, that is, the portions with a high pixel value. In view of this, a high-resolution block image is generated for portions with a high average pixel value in the viewpoint image blocks that are used for interpolation, and a low-resolution block image is generated for portions with a low average pixel value. This enables a surrounding environment light image to be generated quickly.

Hereinafter, the difference between the processing of the present embodiment and the processing of Embodiment 1 will be described using the drawings. In the present embodiment, the processing content of S502 in FIG. 5 differs compared with Embodiment 1. Specifically, parallax maps are generated such that block images having a high average pixel value that are considered to contribute greatly as a surrounding environment light source in CG rendering are created normally as high-resolution parallax maps, and blocks having a low average pixel value are created as low-resolution parallax maps.

Figure 12:
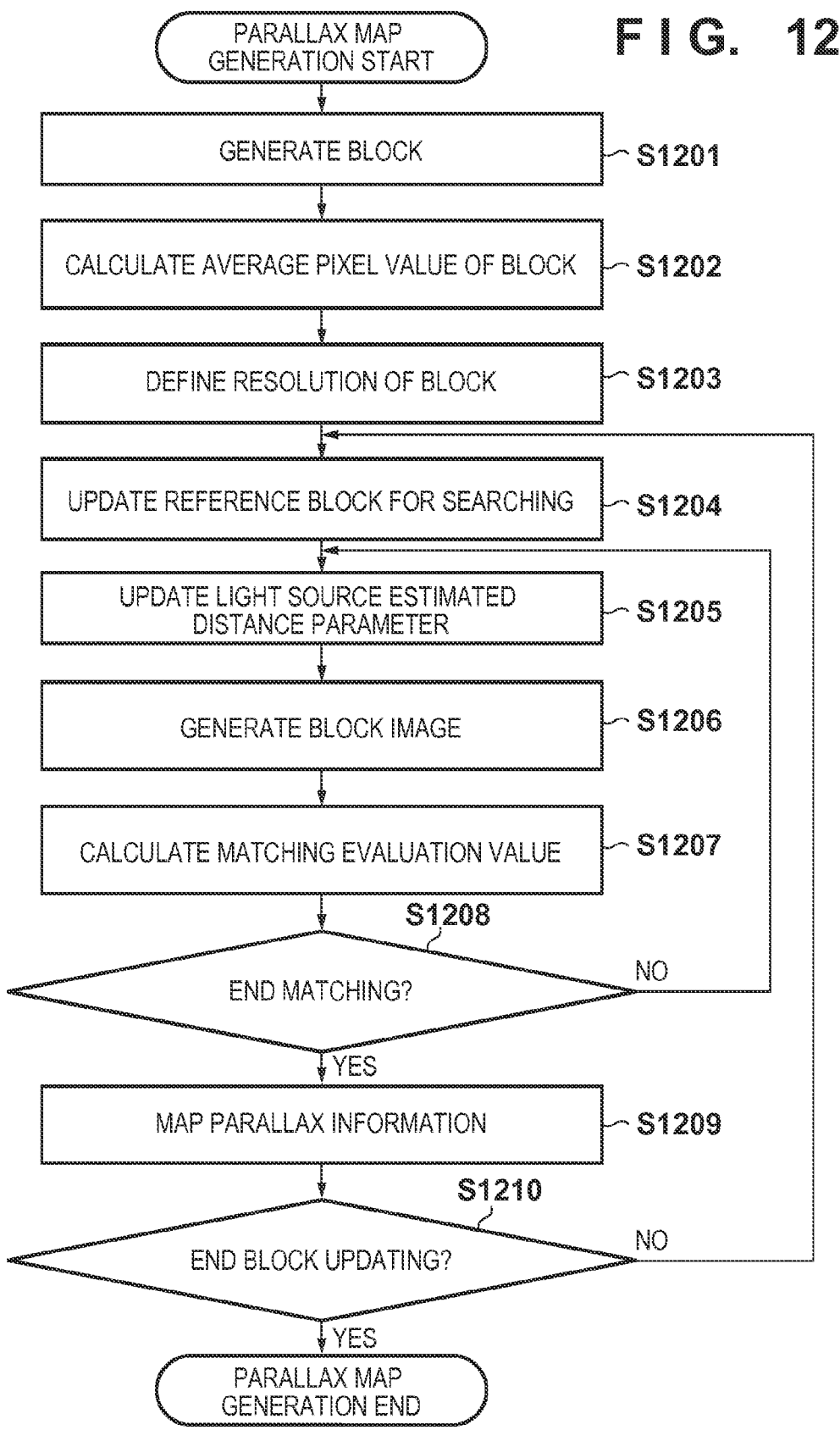
FIG. 12 is a flowchart showing processing for generating a parallax map according to a second embodiment.

FIG. 12 is a flowchart showing an overview of parallax map generation processing (surrounding environment light generation processing) in Embodiment 2. Hereinafter, the flowchart of FIG. 12 will be called "sub-flowchart 4". Note that because the processing of S1204 to S1210 in FIG. 12 is the same as the processing of S602 to S607 in FIG. 6, description thereof will be omitted.

Figure 14A:
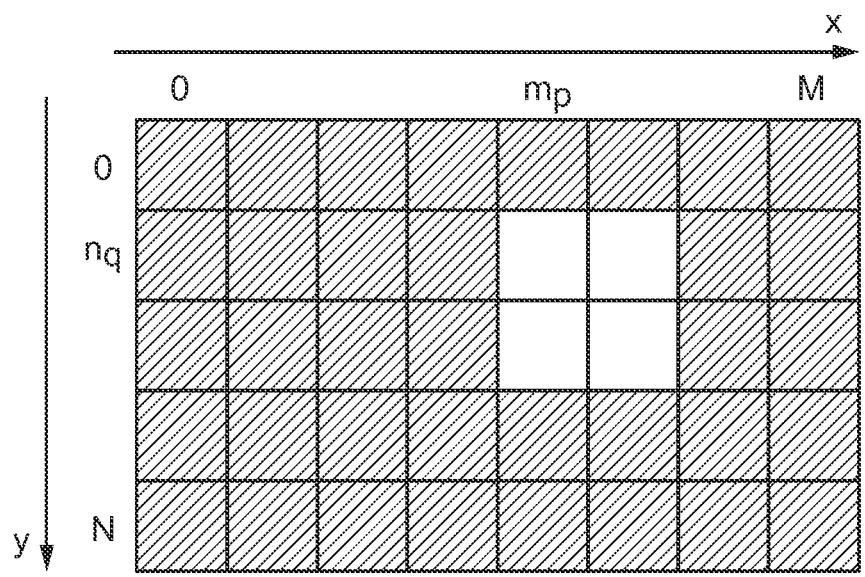
FIGS. 14A and 14B are diagrams illustrating block division processing using an input image according to the second embodiment.

First, at S1201, a given image area in the arbitrary viewpoint image is designated. Here, as shown in FIG. 14A, it is assumed that the image area is divided into (N+1)×(M+1) individual blocks, and that the pixel values of the positions bounded by $(m_p, n_q)$ and $(m_{p+1}, n_{p+1})$ are bright. Also, the blocks are assumed to be divided into 3 vertical pixels and 3 horizontal pixels, similarly to FIG. 9. Note that neither the number of blocks nor the number of pixels in a block is particularly limited to the numbers given above.

Next, at S1202, the average pixel value of each block image is calculated. Specifically, an average pixel value Aimg is derived as follows.

$$A\text{img} = (1/n\text{img})\Sigma I\text{img} \quad (21)$$

Here, nimg denotes the number of pixels in a given viewpoint image block, and Iimg denotes the pixel value of the given viewpoint image block. For example, in the case of creating a surrounding environment light image from given viewpoint images, the block image corresponding to the viewpoint images will be $Bk(m_p, n_q)$, and the average pixel value will be Aimg $(m_p, n_q)$.

Figure 14B:
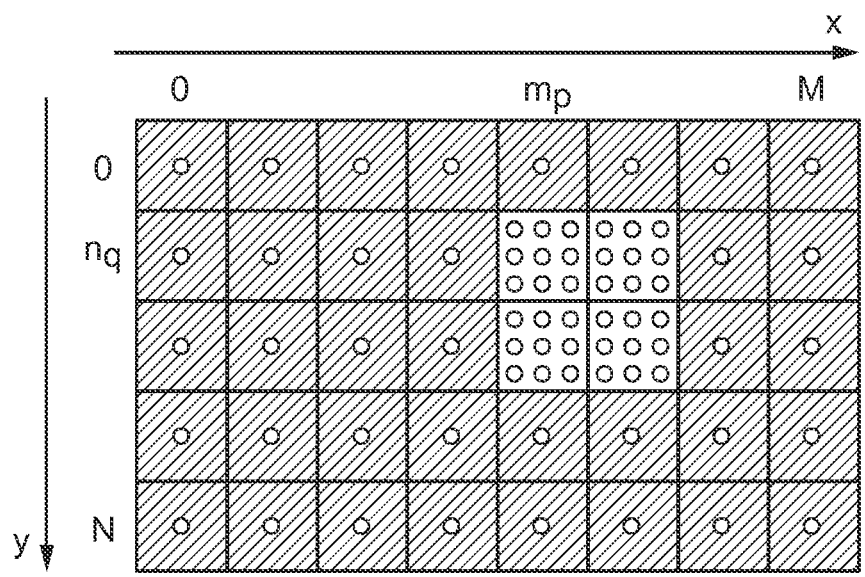

Next, at S1203, the resolution of the block image is defined. Here, if the average pixel value Aimg($m_p, n_g$) of a block image exceeds a predetermined threshold, the resolution of that block is set to 3 vertical pixels and 3 horizontal pixels, as shown in FIG. 14B. If the average pixel value does not exceed the predetermined threshold, the resolution of the block is set to 1 pixel, and the pixel value is set to the center pixel as a reference value, as shown in FIG. 14B. Note that, in the present embodiment, a single predetermined threshold for comparison with the average pixel value of each block image is set, and if the average pixel value exceeds the threshold, the number of pixels in the block is set to 3×3 pixels, and if the average pixel value is less than or equal to the threshold, the number of pixels in the block is set to 1 pixel, but the number of thresholds and the number of pixels in a block are not limited thereto. Thereafter, the respective processing of S1204 to S1210 is performed.

As a result of the above processing, block images for performing calculation preferentially in relation to portions with a high pixel value in the viewpoint images, that is, portions that contribute greatly as a light source, can be generated by performing the sub-flowchart 4.

As described above, according to the present embodiment, surrounding environment light images at arbitrary positions for CG rendering can be generated quickly.

Other Embodiments

Aspects of the present invention can also be realized by a computer of a system or apparatus (or apparatuses such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-139158, filed Jun. 20, 2012 and 2013-086916, filed Apr. 17, 2013, which are hereby incorporated by reference herein in their entirety.

What is claimed is:

1. An image processing apparatus for generating an image of an arbitrary viewpoint using a plurality of input images, wherein the arbitrary viewpoint is virtual viewpoint and different from each viewpoint corresponding to each of the plurality of input images, comprising:
    obtaining unit configured to obtain image information of a projection position at which a point along a first straight line passing through the arbitrary viewpoint and a pixel position on the image of the arbitrary viewpoint is projected onto each of the plurality of input images;
    first defining unit configured to define parallax information of the plurality of input images at the pixel position, using the image information obtained for the point along the first straight line by the obtaining unit; and
    generating unit configured to generate the image of the arbitrary viewpoint, by defining the image information of the pixel position from the plurality of input images using the parallax information for the pixel position,
    wherein the first defining unit calculates a matching evaluation value for image information corresponding to the point along the first line obtained by the obtaining unit, and
    wherein the first defining unit calculates the parallax information based on the matching evaluation value and a distance between the point corresponding to the matching evaluation value and the arbitrary viewpoint.

2. The image processing apparatus according to claim 1, wherein the obtaining unit defines a position at which a second straight line that passes through a point along the first straight line and a viewpoint of the input images intersects a projection plane of the input images as the projection position, and generates image information of the projection position by interpolation using information of pixels adjacent to the projection positions of the input images.

3. The image processing apparatus according to claim 2, further comprising:
    second defining unit configured to set a plurality of points that are equidistant from the arbitrary viewpoint along a plurality of first straight lines that pass through the arbitrary viewpoint and a plurality of pixel positions included in an arbitrary viewpoint block obtained by dividing the image of the arbitrary viewpoint, and define a block image in an input image corresponding to the arbitrary viewpoint block, by using the obtaining unit to obtain image information of a plurality of projection positions where a plurality of second straight lines that pass through the plurality of points and the viewpoint of the input image intersect the projection plane of the input image,
    wherein the first defining unit defines parallax information for the arbitrary viewpoint block based on information of the block image defined by the second defining unit, as parallax information for all the pixel positions in the arbitrary viewpoint block.

4. The image processing apparatus according to claim 1, wherein the first defining unit sets, along the first straight line, a plurality of points at a plurality of distances from the arbitrary viewpoint, defines matching evaluation values for the image information obtained from the plurality of input images at each distance by the obtaining unit, and defines the parallax information based on the distance at which a highest matching evaluation value is obtained among a plurality of points.

5. An image processing apparatus for generating an image of an arbitrary viewpoint using a plurality of input images, comprising:
    obtaining unit configured to obtain image information of a projection position at which a point along a first straight line passing through the arbitrary viewpoint and a pixel position on the image of the arbitrary viewpoint is projected onto each of the plurality of input images;

first defining unit configured to define parallax information of the plurality of input images at the pixel position, using the image information obtained for the point along the first straight line by the obtaining unit; and generating unit configured to generate the image of the arbitrary viewpoint, by defining the image information of the pixel position from the plurality of input images using the parallax information for the pixel position, wherein the first defining unit sets, along the first straight line, a plurality of points at a plurality of distances from the arbitrary viewpoint, defines a matching evaluation value for the image information obtained from the plurality of input images at each distance by the obtaining unit, and defines the parallax information based on the distance at which a highest matching evaluation value is obtained among a plurality of points, and wherein the first defining unit defines the parallax information based on the distance nearest to the arbitrary viewpoint, if the highest matching evaluation value is defined for two or more points along the first straight line.

6. The image processing apparatus according to claim 1, wherein the generating unit generates the image information of the pixel position by weight averaging the plurality of pieces of image information obtained from the plurality of input images.

7. The image processing apparatus according to claim 2, wherein the projection plane of the input images is one of a flat plane, a cylindrical plane and a spherical plane.

8. A control method of an image processing apparatus for generating an image of an arbitrary viewpoint using a plurality of input images, wherein the arbitrary viewpoint is virtual viewpoint and different from each viewpoint corresponding to each of the plurality of input images, comprising the steps of:

obtaining image information of a projection position at which a point along a first straight line passing through the arbitrary viewpoint and a pixel position on the image of the arbitrary viewpoint is projected onto each of the plurality of input images;

defining parallax information of the plurality of input images at the pixel position, using the image information obtained for the point along the first straight line by the obtaining step; and generating the image of the arbitrary viewpoint, by defining the image information of the pixel position from the plurality of input images using the parallax information for the pixel position, wherein a matching evaluation value for image information corresponding to the point along the first line obtained by the obtaining step is calculated by the defining step, and wherein the parallax information is calculated based on the matching evaluation value and a distance between the point corresponding to the matching evaluation value and the arbitrary viewpoint.

9. A non-transitory computer readable storage medium storing a program that causes a computer to execute a control method of claim 8.

10. The image processing apparatus according to claim 3, wherein the plurality of pixel positions included in the arbitrary viewpoint block and the number of pixels are defined by a pixel value of the arbitrary viewpoint block.

11. The image processing apparatus according to claim 10, wherein the pixel value of the arbitrary viewpoint block is an average pixel value of the arbitrary viewpoint block.

12. A control method of an image processing apparatus for generating an image of an arbitrary viewpoint using a plurality of input images, comprising the steps of:

obtaining image information of a projection position at which a point along a first straight line passing through the arbitrary viewpoint and a pixel position on the image of the arbitrary viewpoint is projected onto each of the plurality of input images;

defining parallax information of the plurality of input images at the pixel position, using the image information obtained for the point along the first straight line by the obtaining step; and generating the image of the arbitrary viewpoint, by defining the image information of the pixel position from the plurality of input images using the parallax information for the pixel position, wherein a plurality of points is set along the first straight line at a plurality of distances from the arbitrary viewpoint, a matching evaluation value for the image information obtained from the plurality of input images at each distance by the obtaining step is defined, and the parallax information is defined based on the distance at which a highest matching evaluation value is obtained among a plurality of points, and wherein the parallax information is defined based on the distance nearest to the arbitrary viewpoint, if the highest matching evaluation value is defined for two or more points along the first straight line.

13. The image processing apparatus according to claim 6, wherein the generating unit calculates weights for weight averaging the plurality of pieces of image information obtained from the plurality of input images, based on a distance between a viewpoint of the input images and the arbitrary viewpoint.

14. The image processing apparatus according to claim 13, wherein the generating unit calculates each of the weights so that the weight is inverse proportion to the distance between a viewpoint of the input images and the arbitrary viewpoint.

* * * * *